United States Patent [19]

Raulins et al.

[11] Patent Number: 4,473,245
[45] Date of Patent: Sep. 25, 1984

[54] PIPE JOINT

[75] Inventors: George M. Raulins; George G. Grimmer, both of Dallas, Tex.

[73] Assignee: Otis Engineering Corporation, Dallas, Tex.

[21] Appl. No.: 367,952

[22] Filed: Apr. 13, 1982

[51] Int. Cl.³ .......................... F16L 25/00; F16L 19/00
[52] U.S. Cl. ................................. 285/334; 285/332.3; 285/355
[58] Field of Search ..................... 285/334, 333, 332.2, 285/332.3, 355, 390, 14

[56] References Cited

U.S. PATENT DOCUMENTS

| | | | |
|---|---|---|---|
| 2,610,028 | 9/1952 | Smith | 285/14 X |
| 2,907,589 | 10/1959 | Knox | 285/332.2 X |
| 2,932,531 | 4/1960 | Briechle | 285/332.3 X |
| 3,047,316 | 7/1962 | Wehring et al. | 285/334 |
| 3,100,656 | 8/1963 | MacArthur . | |
| 3,467,413 | 9/1969 | Madrelle . | |
| 3,489,437 | 1/1970 | Duret | 285/334 X |
| 3,489,438 | 1/1970 | McClure . | |
| 3,497,246 | 2/1970 | Weiner . | |
| 3,508,771 | 4/1970 | Duret . | |
| 3,658,368 | 4/1972 | Hokanson . | |
| 3,850,461 | 11/1974 | Fujioka et al. | 285/332.2 |
| 3,856,337 | 12/1974 | Ehm et al. | 285/334 |
| 4,004,832 | 1/1977 | Connelly . | |
| 4,398,756 | 8/1983 | Duret et al. . | |

FOREIGN PATENT DOCUMENTS

| | | |
|---|---|---|
| 635412 | 1/1962 | Canada . |
| 2622944 | 5/1976 | Fed. Rep. of Germany . |

Primary Examiner—Richard J. Scanlan, Jr.
Attorney, Agent, or Firm—Vinson & Elkins

[57] ABSTRACT

A pipe joint in which a metal-to-metal seal is provided on the exterior of the pipe, a torque shoulder provides a further metal-to-metal seal and a still further seal is provided by a resilient ring. The box is protected against ballooning which might result in jump out of the threads by proportioning the thickness of the box at the point of seal at the maximum diameter of seal to the outer diameter of the box as compared to the full wall thickness of the pipe related to the outer diameter of the pipe.

1 Claim, 7 Drawing Figures

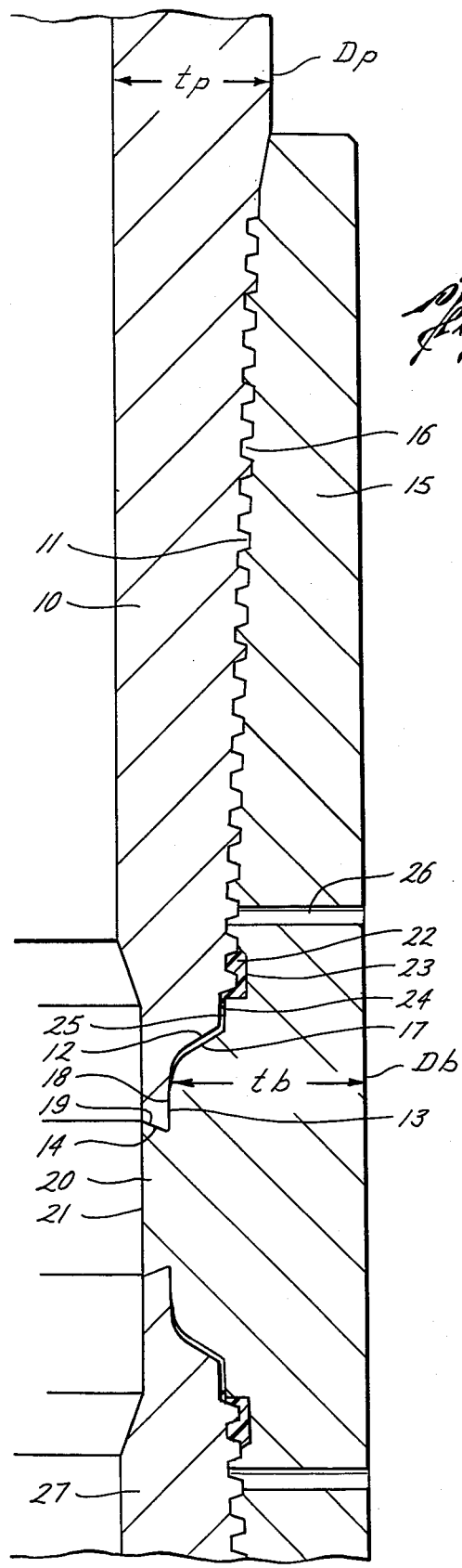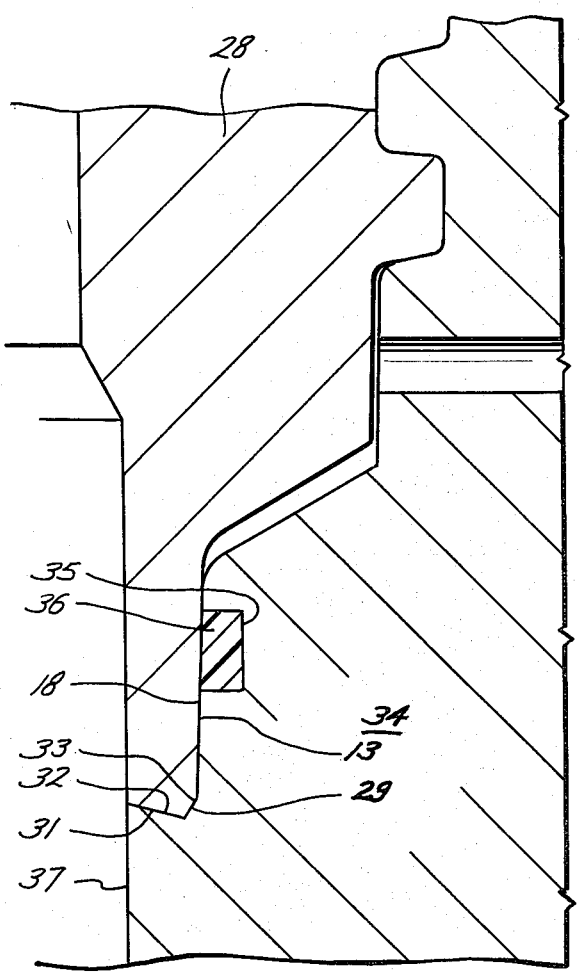

PIPE JOINT

This invention relates to pipe joints and more particularly to joints to be used downhole in a producing well.

The invention may be used with drill pipe, tubing or a casing, all of which are referred to herein as "pipe".

The trend towards deeper and deeper wells, along with higher pressures and more severe environments found at these depths, has created a requirement for heavy wall tubular goods. The depths and pressures require high strength pipe; on the other hand, the severe $H_2S$ conditions require that the material be of low hardness. Low hardness inherently demands softer, and therefore, lower strength materials. Hence "ultra heavy walls" are required to develop the strengths needed.

To utilize the full pipe strength of these ultra heavy wall materials, connections must be developed that utilize as many of the required features of the pipe, while sacrificing as few features as possible. The desired features are that the connections develop full pipe strength and tensile strength, internal pressure rating, and collapse rating. The connection should also be able to withstand high temperatures and/or bending.

In accordance with this invention, the pipe joint is designed such that the box of the joint will have approximately the same internal pressure rating at the point of maximum metal-to-metal seal, that is, resistance to ballooning, as does the full wall thickness of the pipe between a pair of connectors. The thread system may be designed without regard to the seal surfaces between pipe and box and a step surface may joint the metal-to-metal seal system and the thread system.

It is an object of this invention to provide a pipe joint in which the box is designed to have a resistance to ballooning equal to or greater than the pipe connected together by the pipe joint.

Another object is to provide a pipe joint in which the resistance to ballooning of the box at the maximum diameter of the metal-to-metal seal is at least equal to the resistance to ballooning of the pipe being connected together and the thread system may be designed for optimum strength without regard to the metal-to-metal seal.

Another object is to provide a pipe joint of the type having a metal-to-metal seal between the box and an external surface on the pipe in conjunction with a back-up seal of plastic material.

A pipe joint constructed in accordance with this invention will have a wall thickness at the greatest diameter section of the metal-to-metal seal such that this thickness relative to the diameter of the box is equal to or slightly greater than the ratio of the full wall thickness of the pipe to the diameter of the pipe.

Thus, the pipe will be constructed according to the relationship $(tb/Db)=(tp/Dp)$ wherein: tb is the thickness of the box wall at the largest diameter point of sealing engagement between the sealing surfaces in the box and on the outer diameter surface of the pipe, Db is the outer diameter of the box at the point where tb is measured, tp is the full wall thickness of the pipe, and Dp is the diameter of the pipe at the full wall thickness.

Other objects, features and advantages of the invention will be apparent from the drawing, the specification and the claims. In the drawings wherein like reference numerals indicate like parts and illustrative embodiments of this invention are shown:

FIG. 1 is a quarter-section view of a pipe joint including a coupling between two pipes;

FIG. 2 is a fragmentary view on an enlarged scale of a modified form of pipe joint;

Figure 3:
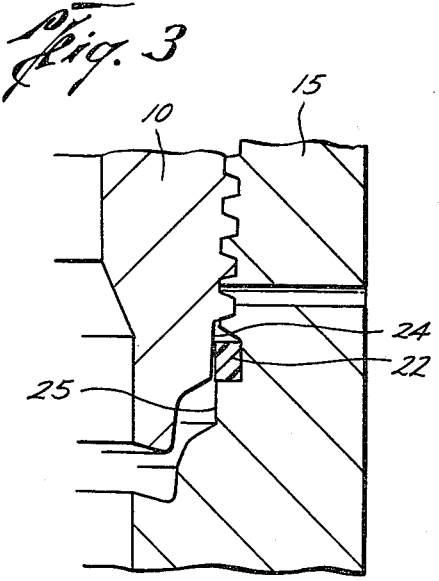
FIGS. 3, 4 and 5 are fragmentary quarter-section views showing sequentially the makeup of the pipe joint of FIG. 1.

The pipe 10 is provided with an external tapered thread 11 thereon. Preferably, this thread is of the buttress type having its load bearing surface extending substantially normal to the center line of the pipe. In some instances, the taper of the threads may be that normally used, that is on the order of three-quarters of an inch per foot. In many instances, where very heavy wall pipe is used, it will be preferred to use a larger taper such as one and one-quarter inch per foot. The use of the steeper taper permits a shorter threaded section of the pipe and box of the coupling. The shorter threaded section in turn reduces the overall length of the coupling and permits greater control and accuracy in cutting threads and other surfaces.

Adjacent the smaller diameter end of thread 11, the outer diameter of the pipe steps down at 12 to a smaller diameter surface 13 which may be smaller than the diameter of the smallest box thread. This surface 13 is a sealing surface and extends annually about the pipe and longitudinally for a short distance adjacent the end of the pipe. This surface 13 should be contoured to result in a firm sealing contact with the box of the coupling when the joint is made up. For instance, the surface may be on a slight taper or it may be on a radius to provide the sealing contact.

Preferably, the pipe is stressed radially outwardly to ensure the sealing characteristics of the surface 13 and for this purpose, the end of the pipe 14 forms an acute angle with the surface 13. By way of example, the sealing surface 13 may be formed on an angle slightly less than 3° and the abutment surface 14 on an angle of approximately 15°.

The box 15 of the coupling will have an internal thread 16 complementary to and mating with the thread 11 on the pipe.

The box will step down at 17 to a smaller diameter sealing surface 18 which sealingly engages with the sealing surface 13 on the pipe.

The box is provided with a torque shoulder 19 extending inwardly from the seal surface 18 to the bore 21 through the coupling. The shoulder 19 should have a matching taper with the shoulder 14 on the end of the pipe which when the pipe is bottomed in the box, limits makeup of the pipe and box and preferably, due to its inclined surface, urges the pipe toward sealing position between the surfaces 13 and 18 which provide the primary seal. Also, the torque shoulder 19 and the end of the pipe 14 may provide a seal, particularly against external pressure.

In the illustrated embodiments of FIGS. 1 and 2, the surfaces 13 and 18 should seal along their entire engaged length. Due to the slight taper of the surfaces, the maximum diameter point of sealing engagement is their point of engagement remote from the abutment shoulder 19. This is the point of last metal-to-metal sealing engagement against pressure within the tubing.

In accordance with this invention, the box is designed such that its strength at this point of maximum sealing diameter resistant to ballooning is equal to or greater than the strength of the pipe to resist ballooning.

In accordance with this invention, the wall thickness (tb) of the box at the point of maximum diameter of the engaged and sealing surfaces 13 and 18 relative to the outer diameter (Db) of the coupling is approximately equal to or greater than the ratio of the full wall thickness of the pipe (tp) relative to the outer diameter of the pipe (Dp) so that the box will be as resistant to ballooning under internal pressure as will the pipe. This will prevent ballooning of the coupling and the possible resultant disengagement of the threads 11 and 16. Thus, so long as the seal provided by surfaces 13 and 18 remains effective, there should be no danger of the threads disengaging due to ballooning of the coupling.

In the form shown FIG. 1 the internal diameter flange 20 results in a larger tb measured at the flange. As the flange is adjacent the point of maximum sealing of surfaces 13 and 18, the flange supports the sealing surfaces against ballooning, resulting in the coupling having a greater (t/D) ratio than the pipe.

Preferably, a resilient seal is provided by a plastic ring 22 in the groove 23 in the box. This ring is preferably of a plastic material such as tetrafluoroethylene. The groove 23 is positioned such that as the pipe is rotated to full make-up position, the small diameter end of thread of thread 11 enters the area of groove 22 and places the ring under substantial compression. The pipe has an annular surface 24 below thread 11 which overlies the seal 22 before the thread 11 begins to compress the seal 22. Preferably, the surface 24 on the pipe is spaced a slight distance from the complementary surface 25 in the box so that the plastic material would be permitted to flow under pressure into the space thus provided. Thus, the seal material forced into the space between surfaces 24 and 25 provides a primary plastic seal backed up by seal material in the thread 11 and groove 23. This plastic seal provides a back-up for the metal-to-metal seals.

It may be desirable to avoid any chance of pressure fluid from within the pipe joint reaching threads 11 and 16. In the makeup of the threads, dope is utilized which might result in a seal between the threads. If the other seals permitted fluid to flow into the threaded area, and a seal inadvertently occurred somewhere along the thread system, then the pressure from within the joint would be acting outwardly on the threaded section of the box and might result in disengagement of the threads due to ballooning of the threaded section of the box. To avoid this possibility, a bleed port 26 may be provided in the box, preferably immediately adjacent the resilient seal 22 so that any leakage of fluid past the seals would be vented to the exterior of the joint and would not cause ballooning of the threaded section of the box.

If desired, the surfaces 18 could be extended away from the torque shoulder 19 and a groove provided in this extended surface for the plastic seal. If the step 17 was of substantial dimension, this would position the plastic seal immediately adjacent the metal-to-metal seal and the value of tb would be approximately the same for the metal-to-metal seal and for the plastic seal.

The relative area of the torque shoulder 19 and the makeup torque should be such that the induced pressure on the shoulder 19 is substantially greater than the internal pressure to be sealed against. For deep high pressure wells, this induced pressure might be on the order of 30,000 to 50,000 psi.

Figure 4:
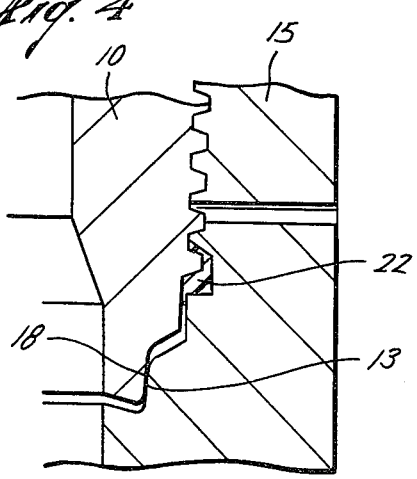
Figure 5:
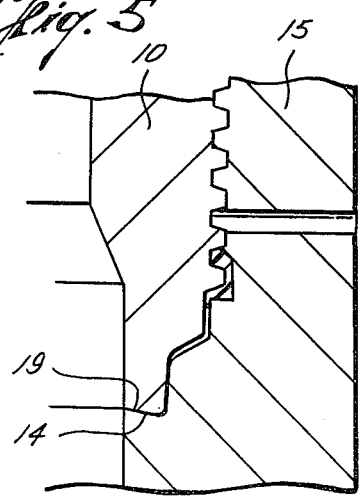

FIGS. 3, 4 and 5 show the makeup of the pipe and box of FIG. 1. In FIG. 3 the pipe 10 has been threaded into the box 15 to the point where the surface 24 overlies the seal 22 to hold it in its groove during final makeup. In FIG. 4 the pipe 10 is shown to be inserted into the box 15 to the extent that the seal 22 has been extruded into the space between the surfaces 24 and 25 and the sealing surfaces 13 and 18 are beginning their makeup. In FIG. 5 the pipe 10 is shown to be in the final fully sealed position in the box with the nose of the pipe in firm engagement with the torque shoulder 18 and the pipe made up preferably to exert a pressure per square inch against the torque shoulder greater than the pressure within the tubing.

Only the upper portion of pipe 27 is shown in the lower end of the coupling. It will be understood that the pipe 27 is identical to pipe 10 and that the coupling is symmetrical and is identical below the flange 20 to the portion of coupling shown above flange 20.

Figure 6:
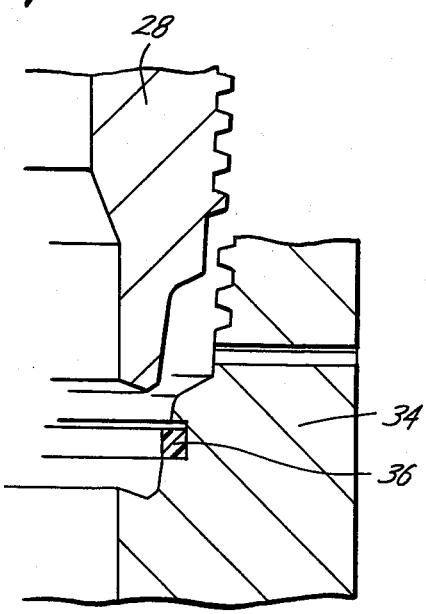
FIGS. 6 and 7 are fragmentary quarter-section views showing sequentially the makeup of the pipe joint of FIG. 2 and illustrating a slightly modified form of joint.
Figure 7:
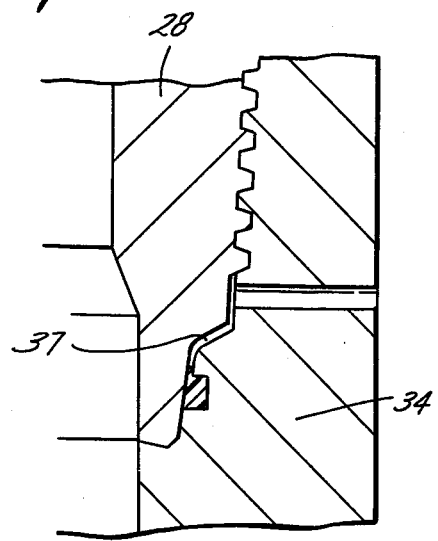

Modified forms of the invention are shown in FIGS. 2, 6 and 7. In the form of the invention of FIG. 2 the pipe 28 is formed with the seal surface 13 and an additional seal surface 29 which cooperates with the end surface 31 of the pipe to form a V-shaped annular member. The surfaces 31 and 29 mate with complementary torque shoulders 32 and seal surface 33 in the box 34. In this form of the invention seals occur at the torque shoulder 31-32, at the seal surface 29 and 33, and at the seal surface 13 and 18. The box is provided with a groove 35 adjacent the upper end of seal surface 18 and again a seal of plastic material 36 is provided in the this groove.

The pipe 28 and box 34 are shown in position with the seal surfaces disengaged in FIG. 6 and it is noted that the seal 36 projects beyond the groove 35. As best shown in FIG. 7, as the nose of the pipe moves into the final sealing position the seal material 36 is compressed and expanded and will flow into the juncture between the seal surfaces 13 and 18. As shown in FIG. 7, if a slight spacing is left between the surfaces 13 and 18 on the side of the seal adjacent the threads, as indicated at 37 in FIG. 7, space will be provided for the seal material to flow into on the side of the plastic seal 36 remote from the torque shoulder 31. Thus, if an excess of seal material is present, as suggested in FIG. 7, it will flow into the space 37 and will not interfere with the metal-to-metal seal of surfaces 13 and 18.

In this form of the invention tb would be measured in the coupling immediately adjacent the groove 35 on the side of the seal groove adjacent to the torque shoulder 31 as the largest point of metal-to-metal seal occurs at this point. In the event of failure of all of the metal-to-metal seals, and energizing of the plastic seal 36, the value of tb at the point of seal of the plastic seal would be only slightly smaller than the value of tb at the metal-to-metal seal; thus the coupling at the plastic seal would be as resistant to ballooning as would be the pipe 28, and the coupling would not balloon at the point of the plastic seal to any appreciable extent. This is particularly true in view of the fact that the flange 37 is again supporting the seals and the resistance of the coupling to ballooning in view of the support of the flange would actually be greater than the resistance of the tubing to ballooning.

The (t/D) of the coupling is preferably equal to that of the pipe. However, it will be appreciated that the (t/D) ratio of the coupling need only approximate that of the pipe. Where the torque shoulder and associated flange is employed, the (t/D) ratio of the coupling may be slightly less than that of the pipe at the point of maximum sealing diameter because of the support of the flange for the sealing surface which would make the coupling stronger than the pipe if the (t/D) ratio of the coupling were equal to that of the pipe. Obviously, the (t/D) ratio may be slightly greater in the coupling relative to the pipe as this provides additional strength and might be preferred where the torque shoulder and its associated flange are not utilized. Also, in some designs it might be acceptable to have a coupling which had a (t/D) ratio approaching that of the pipe, but which was slightly less. Therefore, the invention encompasses a provision of a (t/D) ratio in the coupling which is approximately the (t/D) ratio of the pipe.

To provide the coupling with tensile strength equal to the pipe, the area or amount of metal in the coupling measured at the last full thread or at the plastic seal groove when the groove overlies the threads of the pin is preferably at least equal to the area or amount of metal in the pipe measured at the full wall thickness of the pipe and in planes normal to the joint axis.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A pipe joint comprising,
   a box having a tapered thread therein and an internal annular longitudinally extending sealing surface adjacent the inner end of said thread, and
   a pipe having a tapered thread thereon and an external annular longitudinally extending sealing surface adjacent the end of the pipe for sealing engagement with the sealing surface of the box,
   said box and pipe having the following approximate relationship:

$$(t_b/D_b) = (t_p/D_p)$$

wherein: $t_b$ is the thickness of the box wall at the largest diameter point of sealing engagement between said sealing surfaces, $D_b$ is the outer diameter of the box at the point where $t_b$ is measured, $t_p$ is the full wall thickness of the pipe, and $D_p$ is the diameter of the pipe at the full wall thickness, and
   a plastic seal in an internal groove in the box which is energized by the pipe thread extending partially into the groove when the joint is fully made up,
   the box and pipe immediately adjacent the groove on the side remote from the threads spaced apart to receive the plastic seal as it is extruded by the pipe thread,
   said pipe having an annular unthreaded surface overlying said seal before the seal is engaged by the threaded section of the pipe.

* * * * *

UNITED STATES PATENT AND TRADEMARK OFFICE
CERTIFICATE OF CORRECTION

PATENT NO. : 4,473,245
DATED : September 25, 1984
INVENTOR(S) : George M. Raulins, et al It is certified that error appears in the above-identified patent and that said Letters Patent is hereby corrected as shown below:

On the title page, Item (75) after "Texas" add --James Lee Peterson, Gretna, Louisiana--.

Signed and Sealed this

Twenty-seventh Day of August 1985

[SEAL]

Attest:

DONALD J. QUIGG

Attesting Officer          Acting Commissioner of Patents and Trademarks